(12) United States Patent
Ohashi et al.

(10) Patent No.: US 7,366,443 B2
(45) Date of Patent: Apr. 29, 2008

(54) CONSTANT-VELOCITY JOINT AND IMAGE-FORMING DEVICE

(75) Inventors: Masaaki Ohashi, Inabe (JP); Satoru Fukuzawa, Inabe (JP)

(73) Assignee: NTN Corporation, Osaka (JP)

( * ) Notice: Subject to any disclaimer, the term of this patent is extended or adjusted under 35 U.S.C. 154(b) by 312 days.

(21) Appl. No.: 11/156,565

(22) Filed: Jun. 21, 2005

(65) Prior Publication Data

US 2005/0281586 A1    Dec. 22, 2005

(30) Foreign Application Priority Data

Jun. 22, 2004 (JP) .............................. 2004-183462
Sep. 13, 2004 (JP) .............................. 2004-265202
Sep. 13, 2004 (JP) .............................. 2004-265256

(51) Int. Cl.
    *G03G 15/00* (2006.01)
(52) U.S. Cl. ....................... 399/167; 464/145; 464/903
(58) Field of Classification Search ................ 399/116, 399/167; 464/139, 145, 146, 903
    See application file for complete search history.

(56) References Cited

U.S. PATENT DOCUMENTS

| | | | |
|---|---|---|---|
| 3,226,950 A * | 1/1966 | Leto ............................ | 464/115 |
| 3,877,253 A * | 4/1975 | Yeagle .......................... | 464/35 |
| 4,034,576 A * | 7/1977 | Takahashi et al. .......... | 464/146 |
| 5,855,519 A * | 1/1999 | Kadota ......................... | 464/145 |
| 6,659,650 B2 * | 12/2003 | Joki et al. .................... | 384/572 |
| 2006/0061829 A1 * | 3/2006 | Yamazaki et al. ........... | 358/300 |
| 2006/0067737 A1 * | 3/2006 | Yamazaki et al. ........... | 399/167 |

FOREIGN PATENT DOCUMENTS

| | | | |
|---|---|---|---|
| JP | 52-34699 | | 9/1977 |
| JP | 5-341589 | | 12/1993 |
| JP | 05341589 A | * | 12/1993 |
| JP | 08320026 A | * | 12/1996 |
| JP | 08326770 A | * | 12/1996 |
| JP | 09151954 A | * | 6/1997 |
| JP | 2002213480 A | * | 7/2002 |

* cited by examiner

*Primary Examiner*—Robert Beatty
(74) *Attorney, Agent, or Firm*—Wenderoth, Lind & Ponack, L.L.P.

(57) ABSTRACT

A constant-velocity joint includes an outer ring formed with an annular space therein having an opening at one end thereof. The annular space is defined by a radially outer wall and a radially inner wall. One of the radially inner and outer walls is formed with three axially extending track grooves circumferentially spaced apart from each other by 120 degrees. A cage is inserted in the annular space with one end thereof protruding from the opening of the annular space. A second shaft is provided on the one end of the cage. Balls are retained by the cage and adapted to roll in the track grooves. At least one of the outer ring and the cage is formed of a synthetic resin.

20 Claims, 5 Drawing Sheets

CONSTANT-VELOCITY JOINT AND IMAGE-FORMING DEVICE

BACKGROUND OF THE INVENTION

The present invention relates to a constant-velocity joint through which driving and driven shafts are coupled together so that torque is transmitted from the driving shaft to the driven shaft, and an image forming device using such a constant-velocity joint, such as a copier or a laser beam printer (LBP).

A known image forming device comprises an image-forming unit or units including a photoconductor drum rotated in one direction, and an electrifier, an exposure unit, a developing unit and a transfer/electrifier that are arranged around the radially outer surface of the photoconductor drum. The electrifier uniformly electrostatically charges the entire radially outer surface of the drum. The light exposure unit then emits image-forming light based on image information onto the drum to form an electrostatic latent image on the drum. The developing unit supplies toner onto the latent image to form a toner image. The toner image is transferred onto a transfer material that is being fed by the transfer/electrifier at the same speed as the peripheral speed of the photoconductor drum to form an image on the transfer material.

A monochrome image forming device comprises a single such image forming unit. A full-color image forming device comprises four such image forming units arranged in tandem in the direction of feed of the transfer material, the respective image forming units forming yellow, magenta, cyan and black toner images, which are transferred onto the transfer material to form a color image.

In either of the monochrome and full-color image forming devices, if the photoconductor drum is not rotated at a constant speed per rotation, the electrostatic latent image formed on the photoconductor drum by the exposure unit will partially shrink and partially expand, thus causing the toner image to partially shrink and partially expand, too, when transferred onto the transfer material. Thus, the ultimately obtained image tends to be warped and low in quality.

For the above reason, the photoconductor drum has to be always rotated at a constant speed.

In one conventional image forming device, the rotary shaft of a motor is directly connected to the shaft of the photoconductor drum to rotate the photoconductor drum with the motor. But since it is extremely difficult to support the drum and mount the motor such that the shaft of the drum and the rotary shaft of the motor exactly align with each other, and instead, the drum shaft and the motor rotary shaft tend to incline relative to each other or otherwise get out of alignment with each other, the photoconductor drum cannot usually be rotated at a constant speed. The image ultimately obtained thus tends to be low in quality.

In order to solve this problem, in an image forming device disclosed in JP patent publication 5-341589, the shaft of the photoconductor drum is coupled to the rotary shaft of the motor through a joint, and the position of the drum at which the latent image is formed by the exposure unit is arranged diametrically opposite to the position at which the toner image is transferred onto the transfer material. With this arrangement, although the photoconductor drum cannot be rotated at a constant speed because the joint used here is a nonconstant-velocity joint, it is expected that any shrinkage and expansion of the latent image due to uneven rotational speed of the drum can be canceled by shrinkage and expansion of the toner image when transferred onto the transfer material, so that the image transferred onto the transfer material is free from any shrinkage and expansion.

But actually, it is difficult to arrange the above two positions exactly diametrically opposite to each other due to assembling errors and/or inclination of the photoconductor drum. Thus, it will be difficult to completely cancel any shrinkage and expansion of the latent image with the shrinkage and expansion of the toner image. The ultimately obtained image thus tends to be low in quality.

On the other hand, there are known slide type constant-velocity joints that permit angular and axial displacements of the two shafts. A typical such constant velocity joint is disclosed in JP patent publication 52-34699 which comprises an outer ring, and an inner member inserted in the outer ring around the axis of the outer ring to define an annular gap there between. Three axial track grooves are formed in at least one of the radially inner and outer walls defining the annular gap so as to be circumferentially spaced apart from each other by 120 degrees. The joint further includes a cage inserted in the annular gap and formed with three pockets radially opposite to the respective track grooves. A ball is received in each pocket of the cage so as to roll along the corresponding track groove so that torque is transmitted between the outer ring and the cage through the balls.

The constant-velocity joint disclosed in this publication has its outer ring, inner member, cage and balls all formed of a metal such as steel. Thus, while the joint disclosed in this publication is high in strength, it is heavy, needs grease lubrication, and tends to produce large operating noise. Its use is therefore limited. For example, it is not suitable for use in office machines, audio devices, medical instruments, household appliances, etc.

If such a constant-velocity joint is used in an image-forming device, grease may leak, thereby soiling the transfer material. Thus, such a joint needs some measures against leakage of grease such as a boot. This necessarily increases the number of parts and thus the cost, as well as the size, of the constant-velocity joint.

An object of the present invention is to provide a constant-velocity joint which needs no grease lubrication, is lightweight and small in size, produces less noise, and can be used practically under any circumstances, and to provide an image forming device which can produce high-quality images by always rotating the photoconductor drum at a constant speed.

SUMMARY OF THE INVENTION

According to the present invention, there is provided a constant-velocity joint comprising an outer ring formed with an annular space therein having an opening at one end thereof. The annular space is defined by a radially outer wall and a radially inner wall, such that one of the radially outer wall and the radially inner wall is formed with three axially extending track grooves circumferentially spaced apart from each other by 120 degrees. A cage is inserted in the annular space with one end thereof protruding from the opening of the annular space, a second shaft is provided on the one end of the cage, and balls retained by the cage are adapted to roll in the track grooves. At least one of the outer ring and the cage is formed of a synthetic resin.

In order to further reduce the weight of the joint, the cage and the second shaft may be simultaneously formed of a synthetic resin so as to be integral with each other. Otherwise, the outer ring may comprise a body and a guide shaft extending along an axis of the outer ring, where the radially inner wall is a radially outer surface of the guide shaft, and the body and the guide shaft are simultaneously formed of a synthetic resin so as to be integral with each other.

The synthetic resin forming the outer ring, cage, second shaft and/or guide shaft is preferably an injection-moldable synthetic resin so that these parts can be formed more easily.

The synthetic resin forming the outer ring, cage, second shaft and/or guide shaft may be a lubricant resin so as to reduce the operating noise of the constant-velocity joint.

Preferably, the outer ring has elasticity and applies a preload to the balls to prevent circumferential movement of the outer ring and the cage relative to each other so that the constant-velocity joint can operate at a more constant speed.

Preferably, the outer ring has three grooves formed between the adjacent track grooves to divide the outer ring into three elastic pieces each formed with one of the track grooves in an inner periphery thereof. With this arrangement, if excessive load is applied to the joint, the elastic pieces will elastically deflect radially outwardly, thereby preventing transmission of torque between the outer ring and the cage. The joint thus serves as a torque limiter too. This reduces the possibility of damage to the constant-velocity joint.

In another aspect of the invention, there is provided an image forming device comprising a photoconductor drum having drum shafts, a driving unit having a drive shaft for driving the photoconductor drum, a light exposure unit for forming an electrostatic latent image on the photoconductor drum, a developing unit for supplying toner to the electrostatic latent image on the photoconductor drum to form a toner image, and a transfer unit for feeding a transfer material at the same speed as a peripheral speed of the photoconductor drum to transfer the toner image onto the transfer material, and the above-described constant-velocity joint through which the drive shaft of the drive unit is coupled to one of the drum shafts of the photoconductor drum.

Since at least one of the outer ring and the cage is formed of a synthetic resin, it is possible to minimize the operating noise of the constant-velocity joint, i.e. the noise produced while torque is being transmitted between the outer ring and the cage. It is also possible to eliminate the need to use grease for lubrication, which in turn eliminates the need for a boot for preventing leakage of grease. This simplifies the structure of the constant-velocity joint.

The constant-velocity joint can thus be used under practically any circumstances. For example, it can be used in office machines, audio devices, medical devices, household appliances in which it was impossible to use conventional constant-velocity joints. Use of a constant-velocity joint in these devices will greatly increase the freedom of design of these devices, and will also make it possible to reduce the size and cost of the joint.

The image forming device according to the present invention is characterized in that the shaft of the photoconductor drum and the drive shaft of the drive unit are coupled together through a constant-velocity joint according to the present invention. The constant-velocity joint allows the photoconductor drum to rotate at a constant speed even if the drive shaft of the drive unit and the shaft of the photoconductor drum are inclined relative to each other or otherwise out of alignment with each other.

This in turn prevents any partial shrinkage and partial expansion of the electrostatic latent image formed by the exposure unit and/or the toner image on the photoconductor drum when transferred onto the transfer material. Thus an extremely high-quality image can be formed.

The constant-velocity joint according to the present invention needs no lubrication with grease, so that the possibility of the transfer material being soiled with grease is zero, and the maintenance is easy too. The image forming device according to the present invention produces less operating noise while torque is being transmitted.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
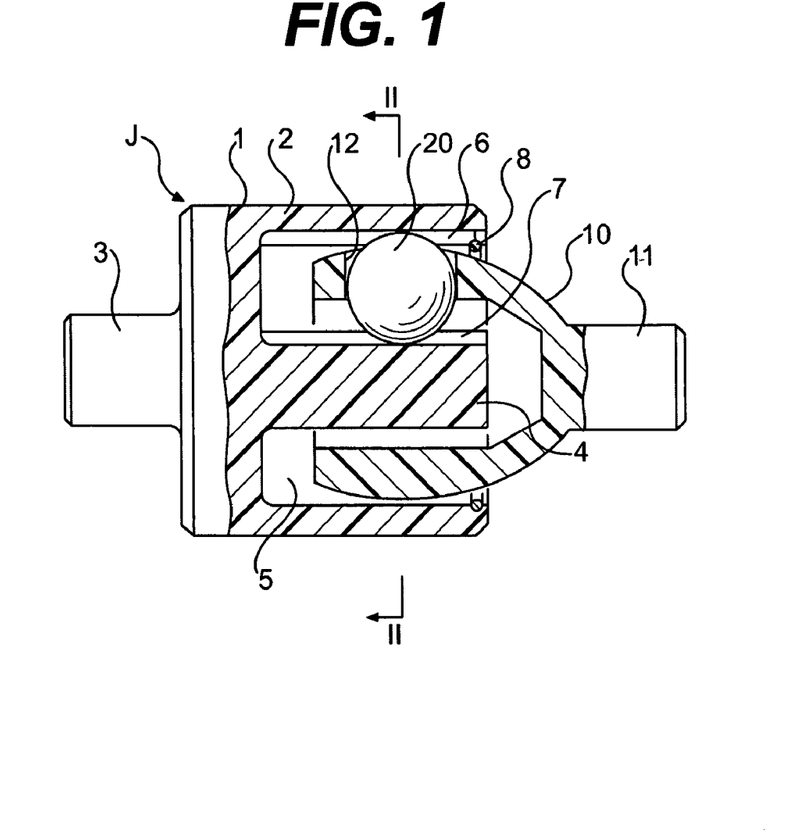
FIG. 1 is a front view in vertical section of a constant-velocity joint according to a first embodiment of the present invention.
Figure 2:
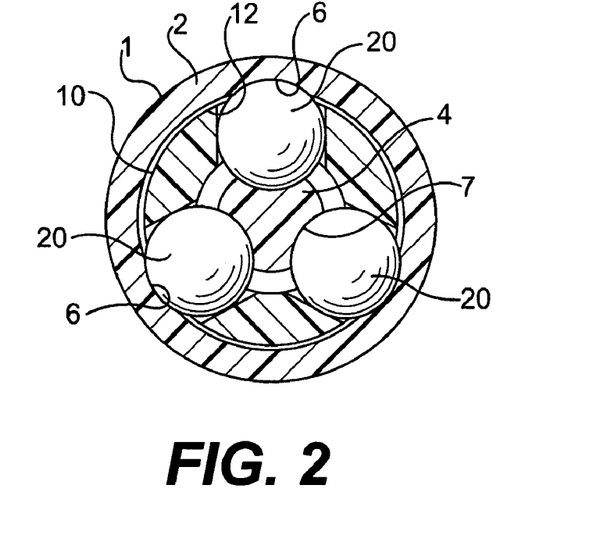
FIG. 2 is a sectional view taken along line II-II of FIG. 1.

Now with reference to the drawings, the embodiments of the present invention are described. FIGS. 1 and 2 show the constant-velocity joint according to a first embodiment of the present invention. As shown, the constant-velocity joint comprises an outer ring 1, a cage 10 and balls 20.

The outer ring 1 includes a cup 2 having an opening at one end, and an end wall closing the other end thereof. A first shaft 3 is integrally formed on the outer surface of the end wall of the cup 2. A guide shaft 4 extends from the inner surface of the end wall along the axis of the outer ring 1 to define an annular space between the guide shaft 4 and the cup 2. Three track grooves 6 and three track grooves 7 are formed in the radially inner surface of the cup 2, which defines the radially outer wall of the annular space 5, and in the outer surface of the guide shaft 4, which defines the radially inner wall of the annular space 5, respectively. The track grooves 6 and 7 are circumferentially spaced apart from each other at equal intervals of 120 degrees.

The track grooves 6 or the track grooves 7 may be omitted.

The cage 10 is received in the annular space 5 defined in the outer ring 1. A second shaft 11 is integrally formed on the end of the cage 10 protruding from the open end of the annular space 5.

The cage 10 is formed with three pockets 12 each corresponding to one of the three track grooves 6 and one of the three track grooves 7. Each of the balls 20 is received in one of the pockets 12 so as to roll along one of the track grooves 6 and one of the track grooves 7.

A snap ring 8 is fitted on the inner surface of the cup 2 near its open end to keep the cage 10 from slipping out of the outer ring 1.

The outer ring 1 and the cage 10 are formed of a synthetic resin. A suitable synthetic resin should be selected taking into consideration the environment of use. Preferably, an injection-moldable synthetic resin is selected. If an injection-moldable resin is selected, it may be either a thermoplastic resin or a thermosetting one.

Some injection-moldable resins are crystalline and others are amorphous. While either type is usable in the present invention, a crystalline resin is preferable because an outer ring and/or a cage made of an amorphous resin tends to break suddenly if torque above the upper limit is applied due to low toughness of an amorphous resin.

Preferable synthetic resins include synthetic resins that are high in lubricity, such as polyacetal resins (POM), nylon resins, injection-moldable fluororesins including perfluoroalkoxyethylene (PFA), fluoroethylenepropylene (FEP) and polyethylene-tetrafluoroethylene (ETFE), and injection-moldable polyimide resins, polyphenylene sulfide resins (PPS), full aromatic polyester resins, polyether ether ketone resins (PEEK) and polyamide-imide resins.

The outer ring 1 and the cage 10 may be made of only one of these resins, a polymer alloy which is a mixture of two or more of these resins, or a polymer alloy which is a mixture of a synthetic resin other than the abovementioned resins which is lower in lubricity, and at least one of the abovementioned synthetic resins.

Further, the outer ring 1 and the cage 10 may be made only of a synthetic resin that is low in lubricity in itself if its lubricity is improved by adding a solid lubricant or a lubricating oil thereto. The solid lubricant may be polytetrafluoroethylene, graphite or molybdenum disulfide.

In order to increase the strength of the outer ring 1 or the cage, glass fibers, carbon fibers or mineral fibers (whiskers) may be added to the synthetic resin or resins. Solid lubricants may be used together with such fibers.

Most preferably, the outer ring 1 and the cage 2 are formed of POM, a nylon resin, PPS or PEEK. The nylon resin used may be nylon 6, nylon 66, nylon 610, nylon 612, nylon 11, nylon 12, nylon 46 or a semi-aromatic nylon having an aromatic ring in its molecular chain. Because POM, nylon resins and PPS are sufficiently heat-resistant and high in lubricity, and are relatively inexpensive, by using one or more than one of these materials, a high cost performance constant-velocity joint is provided.

PEEK shows superior mechanical strength and lubricity without adding a reinforcing material or a lubricant. Thus, by using PEEK, a high-performance constant-velocity joint is provided.

As is apparent from the above description, since the outer ring 1 and the cage 10 are made of a synthetic resin, the constant-velocity joint is lightweight, and produces little noise while torque is being transmitted therethrough. Because no grease is necessary for lubrication, the constant-velocity joint needs less parts, is small in size and simple in structure.

The constant-velocity joint of the present invention can therefore be used in a wide variety devices and machines, including food processing machines.

The balls 20 may be made of bearing steel, stainless steel, ceramic material or synthetic resin. If the constant-velocity joint is used in a medical instrument or a food preparation machine, the balls 20 are preferably formed of stainless steel or ceramic material to avoid environmental concerns. If the balls 20 are made of a synthetic resin, a lightweight, quiet constant-velocity joint is obtained. Also, if the outer ring is made of a synthetic resin, a white or whitish resin should be used to give users hygienic impressions. Among such synthetic resins, POM is the most preferable because it is whitish in color and high in lubricity, thereby eliminating the need for grease.

In the first embodiment, the cage 10 and the second shaft 11 are formed of a synthetic resin so as to be integral with each other. But instead, the second shaft 11 may be made of a ceramic material or a metal such as steel, stainless steel or an aluminum alloy, and joined to the cage 10, which is made of a synthetic resin, by bolts or any other means.

If the second shaft 11 has a length greater than the overall length of the constant-velocity joint except the shaft 11, in order to minimize torque loss, the second shaft 11 is preferably formed of a ceramic material or a metal.

In the embodiment, the cup 2 and the guide shaft 4 of the outer ring 1 are made of a synthetic resin so as to be integral with each other. But instead, the guide shaft 4 may be made of a ceramic material or a metal such as steel, stainless steel or an aluminum alloy, and joined to the cup 2.

But to provide a lightweight constant-velocity joint, the cup 2 and the guide shaft 4, as well as the cage 10 and the second shaft 11, should be made of a synthetic resin so as to be integral with each other, as shown.

If the outer ring 1 is made of a synthetic resin, a preload can be applied to the balls 20 using the elasticity of the outer ring 1, as shown. Specifically, in the first embodiment, in order to apply a preload to the balls 20, the distance between the deepest portions of the opposed track grooves 6 and 7 is smaller than the diameter of the balls 20. By applying a preload, the constant-velocity joint can operate at a more constant speed. This is possible because the outer ring 1 is made of a synthetic resin.

In the first embodiment, both the outer ring 1 and the cage 10 are made of a synthetic resin. But instead, only one of the outer ring 1 and the cage 10 may be made of a synthetic resin.

Figure 3:
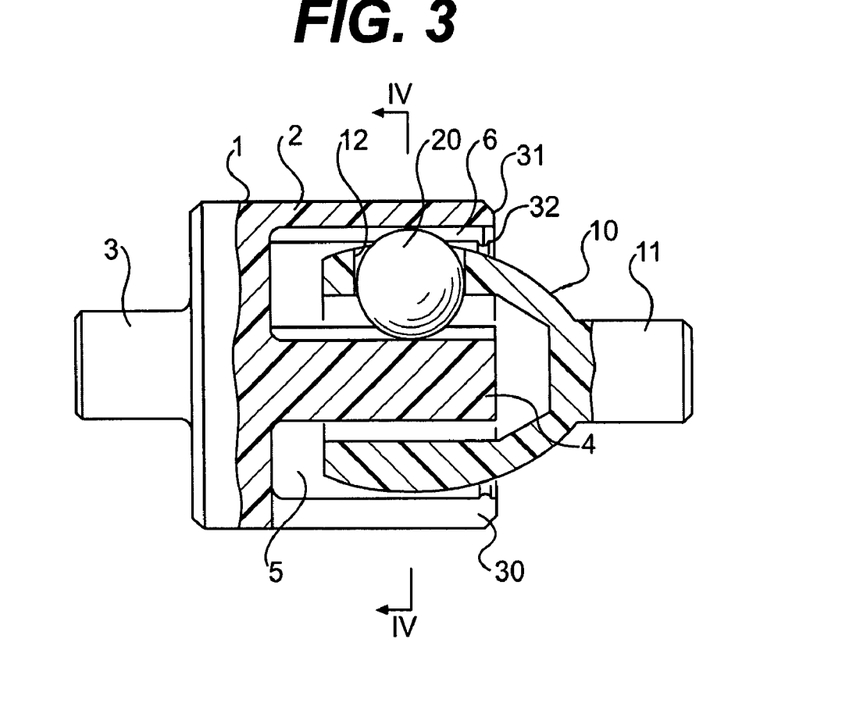
FIG. 3 is a front view in vertical section of a constant-velocity joint according to a second embodiment of the present invention.
Figure 4:
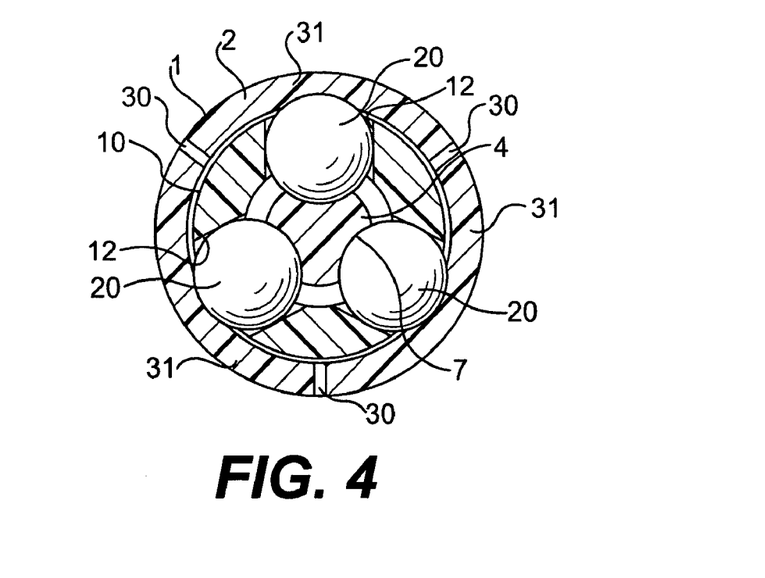
FIG. 4 is a sectional view taken along line IV-IV of FIG. 3.

FIGS. 3 and 4 show the constant-velocity joint according to the second embodiment of the present invention. The constant-velocity joint of the second embodiment differs from that of the first embodiment in that three grooves 30 are formed in the cup 2, each between adjacent track grooves 6, so as to extend axially from its open end to define three elastic pieces 31, each including one of the track grooves 6. Each elastic piece 31 has a protrusion 32 on its radially inner surface near the open end of the cup to keep the cage 10 inseparable from the cup.

Otherwise, the constant-velocity joint of the second embodiment is identical in structure to that of the first embodiment. Thus, like elements are denoted by like numerals, and their description is omitted.

The three elastic pieces 31, which are circumferentially separated from each other by the three axial grooves 30, are elastically deformable radially of the cup.

With this arrangement, when the cage 10 is inserted into the cup 2 through its open end to assemble the joint, the balls 20 will abut the protrusions 32, thereby elastically and radially outwardly deflecting the elastic pieces 31. The cage 10 and the balls 20 can thus be easily pushed into the annular space 5. Once the balls 20 pass the protrusions 32, the protrusions 32 will elastically return to their original position, thereby keeping the cage 10 and the balls 20 from separating from the outer ring 1.

The constant-velocity joint can thus be easily assembled without using any special tool. No snap ring 8 used in the embodiment of FIG. 1 is necessary, either. The arrangement of the second embodiment thus contributes to a reduction in the number of parts.

In the second embodiment, if the outer ring 1 is made of a synthetic resin having a high elastic modulus, or if the cup 2 of the outer ring 1 has a sufficient wall thickness, a preload can be applied to the balls 20 from the elastic pieces 31. This allows the constant-velocity joint to operate at a more constant speed with minimum run-out.

If torque higher than a maximum permissible torque determined by the elastic modulus of the outer ring 1 is applied to the joint, the elastic pieces 31 are allowed to elastically deflect radially outwardly of the cup 2, thereby preventing transmission of torque between the outer ring 1 and the cage 10. The constant-velocity joint thus acts as a torque limiter, too, thereby preventing damage to itself.

In order to apply a preload to the balls 20, a snap ring may be fitted on the outer periphery of the cup 2 near its open end.

If no torque limiting function is required, a snap ring is fitted on the outer periphery of the cup 2 near its open end so that the elastic pieces 31 cannot elastically deflect radially outwardly of the cup even if a torque greater than the elastic modulus of the outer ring 1 acts on the joint.

Figure 5:
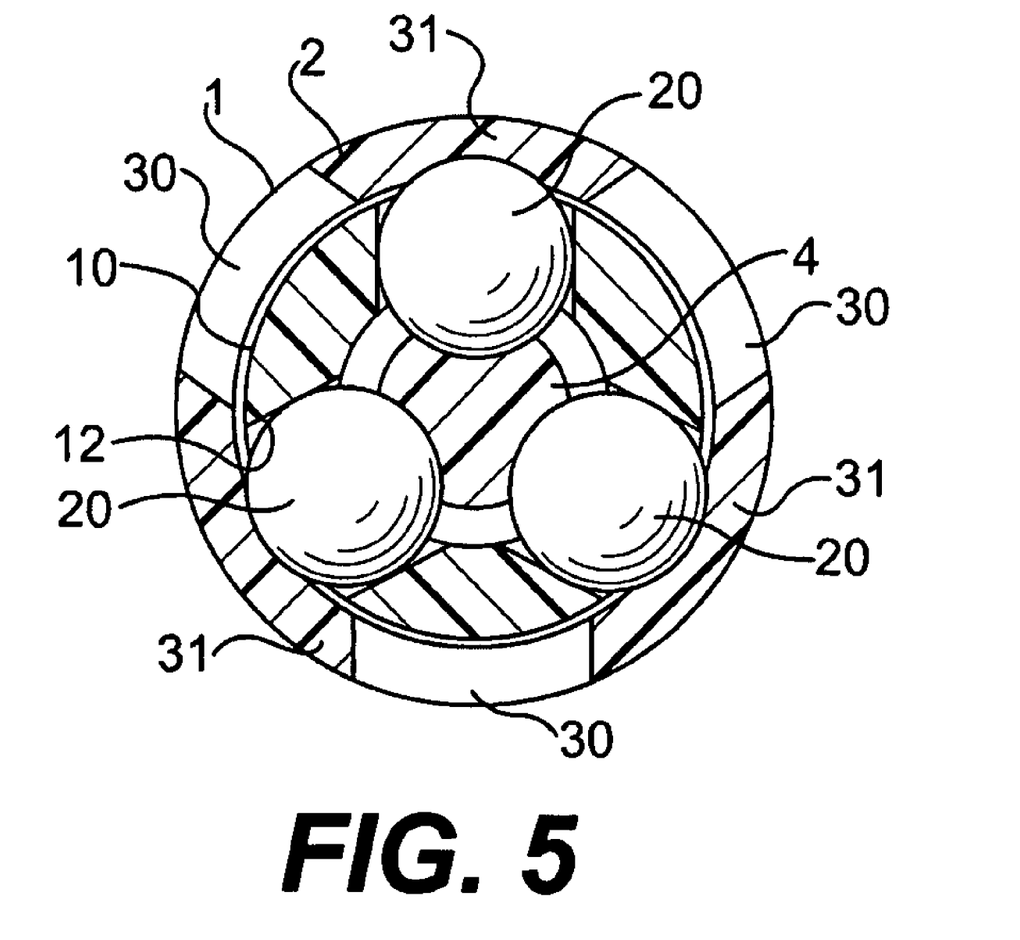
FIG. 5 is a sectional view of a constant-velocity joint formed with different grooves that divide the outer ring into elastic pieces.

The grooves 30 shown in FIGS. 3 and 4 are slits. But the grooves 30 of the second embodiment are not limited to slits. For example, as shown in FIG. 5, the grooves 30 may be ones that are wide in the circumferential direction of the cup 2.

Figure 6:
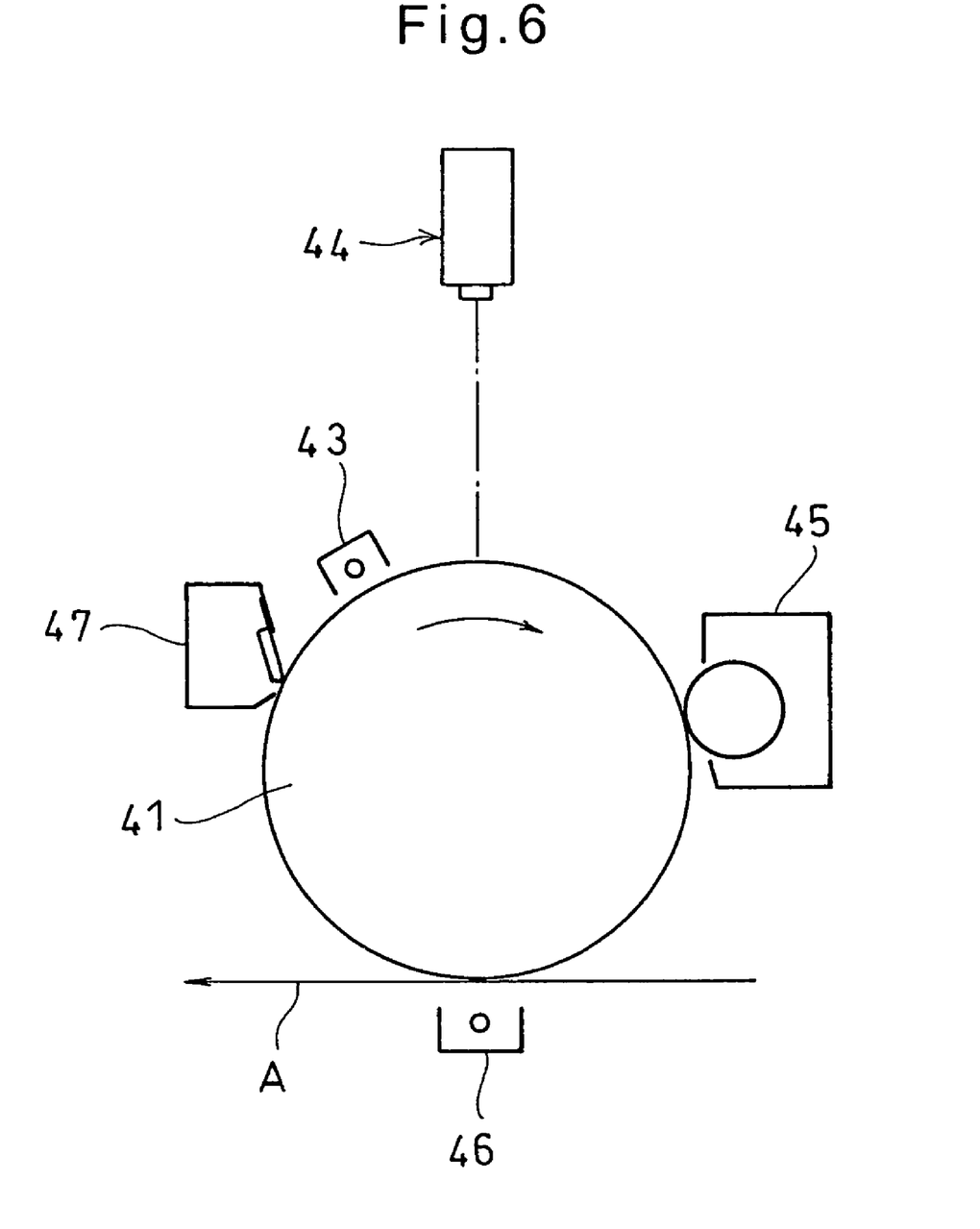
FIG. 6 is a schematic view of an image forming device embodying the present invention.
Figure 7:
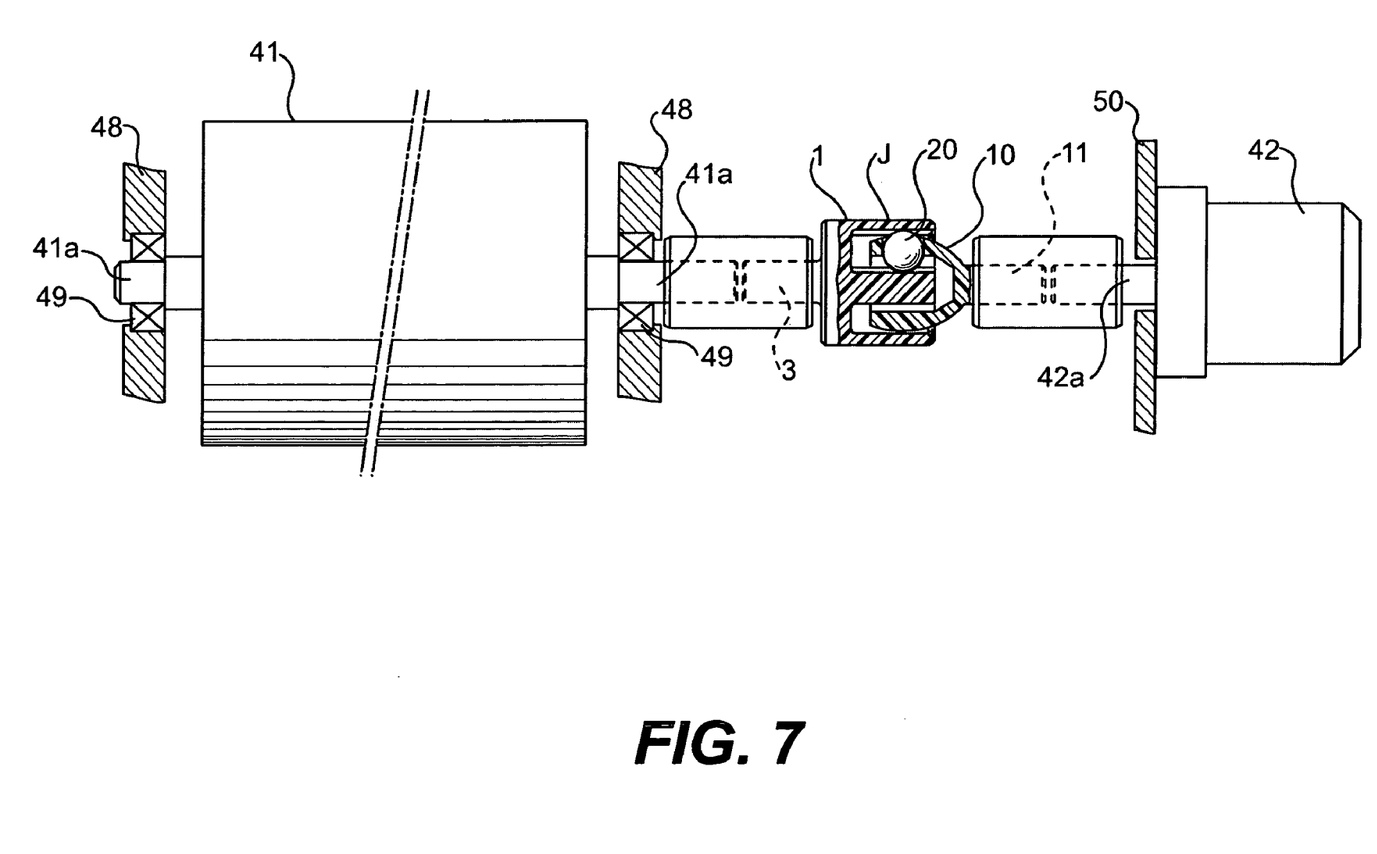
FIG. 7 is a partially cutaway front view of the image forming device of FIG. 6, showing how the photoconductor drum is coupled to and driven by the drive unit.

FIG. 6 shows a monochrome image forming device having a photoconductor drum 41 which is driven by a motor 42 shown in FIG. 7 in the direction of the arrow of FIG. 6. Around the photoconductor drum 41, an electrifier 43, a light exposure unit 44, a developing unit 45, a transfer/electrifier 46 and a cleaner 47 are arranged in this order around the photoconductor drum 41 in the direction of rotation thereof.

While the photoconductor drum 41 is rotating, the electrifier 43 uniformly electrostatically charges the outer periphery of the photoconductor drum 42, the light exposure apparatus 44 then emits image-forming light based on image information onto the drum 41 to form an electrostatic latent image on the drum 41. The developing unit 45 supplies toner onto the latent image to form a toner image, and the toner image is transferred onto a transfer material A that is being fed by the transfer/electrifier 46 at the same speed as the peripheral speed of the photoconductor drum 41 to form an image on the transfer material A. After transferring the image, any toner remaining on the drum 41 is removed by the cleaner 47.

As shown in FIG. 7, the photoconductor drum 41 carries drum shafts 41a at both ends, each rotatably supported on one of a pair of side frames 48 through a bearing 49. The motor 42 for driving the photoconductor drum 41 is mounted on a casing 50 so as to axially oppose the photoconductor drum 41.

The rotary shaft 42a of the motor 42 is connected to one of the drum shafts 41a of the photoconductor drum 41 through a constant-velocity joint J.

As the constant-velocity joint J, the one shown in FIG. 1 is used.

The constant-velocity joint J allows the photoconductor drum 41 to rotate at a constant speed even if the drum shafts 41a of the photoconductor drum 41 and the rotary shaft 42a of the motor 42 are inclined relative to each other or otherwise not aligned with each other. By rotating the photoconductor drum 41 at a constant speed, it is possible to prevent shrinkage or expansion of any electrostatic latent image formed on the photoconductor drum 41, and also to prevent any toner image on the photoconductor drum 41 from shrinking or expanding when it is transferred to the transfer material A by the transfer/electrifier 46.

Thus, it is possible to form high-quality images. Also, because the exposure unit 44 and the transfer/electrifier 46 need not be arranged so as to be diametrically opposite to each other, the image forming device can be designed more freely.

Since the outer ring 11 and the cage 21 of the constant-velocity joint J are formed of a synthetic resin, no lubricating grease is necessary.

This results in easy maintenance of the image forming device. The transfer material A is free of stains by splashed grease. Since the outer ring 11 and the cage 21 are formed of a synthetic resin, the constant-velocity joint J is quiet while torque is being transmitted.

The image forming device shown in FIG. 6 is a monochrome image forming device. A full-color image forming apparatus comprises four monochrome image forming devices of FIG. 6 that are arranged in tandem in the feed direction of the transfer material A. In the respective image forming devices, yellow, magenta, cyan and black toners are used to form toner images of four different colors, and the toner images are superposed on the transfer material A to form a color image.

What is claimed is:

1. A constant-velocity joint comprising an outer ring formed with an annular space therein having an opening at one end thereof, said annular space being defined by a radially outer wall and a radially inner wall, one of said radially outer wall and said radially inner wall being formed with three axially extending track grooves circumferentially spaced apart from each other by 120 degrees, a cage inserted in said annular space with one end thereof protruding from said opening of said annular space, a second shaft provided on said one end of said cage, and balls retained by said cage and adapted to roll in said track grooves, said outer ring being formed of a synthetic resin.

2. The constant-velocity joint of claim 1 wherein said outer ring comprises a body and a guide shaft extending along an axis of said outer ring, said radially inner wall being a radially outer surface of said guide shaft, said body and said guide shaft being simultaneously formed of a synthetic resin so as to be integral with each other.

3. The constant-velocity joint of claim 1 wherein the synthetic resin forming said outer ring, cage, second shaft and/or guide shaft is an injection-moldable synthetic resin.

4. The constant-velocity joint of claim 1 wherein the synthetic resin forming said outer ring, cage, second shaft and/or guide shaft is a lubricant resin.

5. The constant-velocity joint of claim 1 wherein said outer ring has elasticity and applies a preload to said balls.

6. The constant-velocity joint of claim 1 wherein said outer ring has three grooves formed between said adjacent track grooves to divide said outer ring into three elastic pieces each formed with one of said track grooves in an inner periphery thereof.

7. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 1 through which said drive shaft of said driving unit is coupled to one of said drum shafts of said photoconductor drum.

8. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 2 through which said drive shaft of said driving unit is coupled to one of said drum shafts of said photoconductor drum.

9. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 3 through which said drive shaft of said driving unit is coupled to one of said drum shafts of said photoconductor drum.

10. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 4 through which said drive shaft of said driving unit is coupled to one of said drum shafts of said photoconductor drum.

11. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 5 through which said drive shaft of said driving unit is coupled to one of said drum shafts of said photoconductor drum.

12. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 6 through which said drive shaft of said driving unit is coupled to one of said drum shafts of said photoconductor drum.

13. The constant-velocity joint of claim 1 wherein said cage is formed of a synthetic resin.

14. The constant-velocity joint of claim 13 wherein said cage and said second shaft are simultaneously formed of a synthetic resin so as to be integral with each other.

15. The constant-velocity joint of claim 13 wherein said outer ring comprises a body and a guide shaft extending along an axis of said outer ring, said radially inner wall being a radially outer surface of said guide shaft, said body and said guide shaft being simultaneously formed of a synthetic resin so as to be integral with each other.

16. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 13 through which said drive shaft of said driving unit is coupled to one of said drum shafts of said photoconductor drum.

17. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 14 through which said drive shaft of said driving unit is coupled to one of said drum shafts of said photoconductor drum.

18. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 15 through which said drive shaft of said driving unit is coupled to one of said drum shafts of said photoconductor drum.

19. A constant-velocity joint comprising an outer ring formed with an annular space therein having an opening at one end thereof, said annular space being defined by a radially outer wall and a radially inner wall, one of said radially outer wall and said radially inner wall being formed with three axially extending track grooves circumferentially spaced apart from each other by 120 degrees, a cage inserted in said annular space with one end thereof protruding from said opening of said annular space, a second shaft provided on said one end of said cage, and balls retained by said cage and adapted to roll in said track grooves, wherein said cage and said second shaft are simultaneously formed of a synthetic resin so as to be integral with each other.

20. An image forming device comprising a photoconductor drum having drum shafts, a driving unit having a drive shaft for driving said photoconductor drum, a light exposure unit for forming an electrostatic latent image on said photoconductor drum, a developing unit for supplying toner to said electrostatic latent image on said photoconductor drum to form a toner image, a transfer unit for feeding a transfer material at the same speed as a peripheral speed of said photoconductor drum to transfer said toner image onto said transfer material, and a constant-velocity joint of claim 19 through which said drive shaft of said driving unit is coupled to one of said drum shafts of said photoconductor drum.

* * * * *